US009665934B2

(12) United States Patent
Bettagere et al.

(10) Patent No.: US 9,665,934 B2
(45) Date of Patent: May 30, 2017

(54) APPARATUS FOR DETECTING FAULTS IN VIDEO FRAMES OF VIDEO SEQUENCE

(71) Applicant: Texas Instruments Incorporated, Dallas, TX (US)

(72) Inventors: Pramod Krishnamurthy Bettagere, Bangalore (IN); Pratish Kumar KT, Bangalore (IN); Anish Reghunath, Plano, TX (US); Brian O. Chae, Johns Creek, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 14/923,753

(22) Filed: Oct. 27, 2015

(65) Prior Publication Data

US 2016/0117557 A1 Apr. 28, 2016

Related U.S. Application Data

(60) Provisional application No. 62/069,643, filed on Oct. 28, 2014.

(51) Int. Cl.
*G06T 7/00* (2017.01)
*H04N 17/00* (2006.01)

(52) U.S. Cl.
CPC .......... *G06T 7/001* (2013.01); *H04N 17/004* (2013.01)

(58) Field of Classification Search
CPC ...... G06T 7/001; H04N 17/004; H04B 7/216; H04Q 7/00
See application file for complete search history.

(56) References Cited

U.S. PATENT DOCUMENTS

2006/0107151 A1* 5/2006 Mushirabad ....... G01R 31/3187
714/733

OTHER PUBLICATIONS

"TDA3x SoC Processors for Advanced Driver Assist Systems (ADAS) Technical Brief"; Texas Instruments; TDA3; SPRT704A; Oct. 2014, Revised Oct. 2014; 6 pgs.
"New TDA3x SoC for ADAS Solutions in Entry- to Mid-Level Automobiles"; Texas Instruments; SPRT708A; Copyright 2014; 4 pgs.

(Continued)

*Primary Examiner* — Siamak Harandi
*Assistant Examiner* — Shaghayegh Azima
(74) *Attorney, Agent, or Firm* — Gregory J. Albin; Charles A. Brill; Frank D. Cimino

(57) ABSTRACT

A fault detection circuit for detecting faults in a video sequence includes a multiple input signature register (MISR) with a linear feedback shift register (LFSR) that receives pixel data for pixels in a frame region for video frames of a video sequence and receives a read signal to read the pixel data and shift the MISR; a multiple signature storage buffer (MSSB) that stores frame signatures; and a signature comparator that compares current and reference frame signatures to determine if a fault condition exists in the video sequence. The MISR holds a frame signature for the frame region of the video frame while receiving a frame end signal. The MSSB stores a current frame signature held by the MISR after receiving the frame end signal. The MSSB also stores a reference frame signature. A display processing circuit includes the fault detection circuit. An integrated circuit includes the display processing circuit.

29 Claims, 15 Drawing Sheets

(56) References Cited

OTHER PUBLICATIONS

"ADAS Applications Processor TDA2x System-on-Chip Technical Brief"; Texas Instruments; TDA2; SPRT680; Oct. 2013; 4 pgs.
"TDA2x ADAS System-on-Chip"; Texas Instruments; SPRT681; Copyright 2013; 3pgs.

* cited by examiner

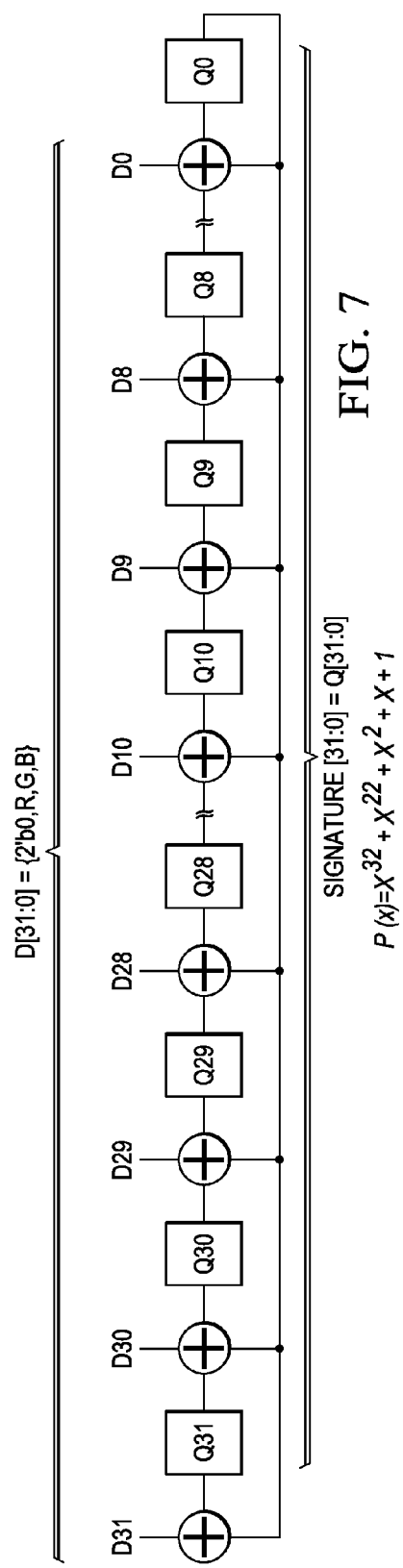

APPARATUS FOR DETECTING FAULTS IN VIDEO FRAMES OF VIDEO SEQUENCE

The present application claims priority to and the benefit of U.S. Provisional Patent Application Ser. No. 62/069,643, filed Oct. 28, 2014 and entitled AUTOMATIC HARDWARE BASED DETECTION AND REPORTING OF FRAME-FREEZE OR FRAME-MISMATCH CONDITION IN DISPLAY BLOCK, the entirety of which is incorporated herein by reference.

TECHNICAL FIELD

This disclosure relates generally to detecting faults in video frames of a video sequence. More specifically, this disclosure relates to a fault detection circuit that generates signatures for video frames in the video sequence and compares a current frame signature to a reference frame signature to detect a fault, such as a freeze fault or a data mismatch fault, in the video sequence. Upon detection of a fault, the fault detection circuit may generate a fault interrupt. The fault detection circuit may be implemented in a display processing circuit. The display processing circuit may be implemented in an integrated circuit.

BACKGROUND

A video processing system captures or receives video frame data and perhaps other image data in processing video frames for a video sequence. The video frame data is formed by an array of pixels. Each pixel is defined by pixel data identifying specific color components, color characteristics, and/or grayscale characteristics. Typically, most parts video frames in a video sequence vary from frame-to-frame or at least within a certain number of frames. However, some parts of video frames remain the same for a certain number of frames or an entire video sequence. The parts of video frames that vary are presumed to include video that was originally captured by a video camera or similar input device. Freeze frame and data mismatch faults in a video sequence are undesirable. The parts of video frames that remain the same are presumed to include image overlays that may provide text information, icons, symbols, or test patterns. Freeze frame faults occur when the same video frame is repeated by the video processing system instead of properly continuing with subsequent video frames of the video sequence. Data mismatch faults occur when the expected content of an image overlay is not present in a given video frame. Current solutions for fault detection in video processing systems insert undesirable latency in the video processing, increase the memory bandwidth required for video processing, and increase power consumption for the video processing system. Improved fault detection techniques are needed.

SUMMARY

In one aspect, a fault detection circuit for detecting faults in a video sequence is provided. In one embodiment, the fault detection circuit includes a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of a video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame; a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and a signature comparator configured to compare the current and reference frame signature values stored by the MSSB to determine if a fault condition exists for one or more frames in the video sequence.

In another aspect, a display processing circuit for detecting faults in a video sequence in conjunction with interfacing the video sequence with a display device is provided. In one embodiment, the display processing circuit includes an image processor interface configured to receive pixel data for each video frame of a video sequence from an image processing circuit; a video processor configured to process the video frames of the video sequence; a display interface configured to provide the video sequence to a display device; and a fault detection circuit configured to detect faults in the video sequence, the fault detection circuit comprising: a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of the video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame; a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and a signature comparator configured to compare the current and reference frame signature values stored by the MSSB to determine if a fault condition exists for one or more frames in the video sequence.

In yet another aspect, an integrated circuit for detecting faults in a video sequence in conjunction with interfacing an image sensor with a display device is provided. In one embodiment, the integrated circuit includes an image capturing circuit configured to form a video sequence of video frames in conjunction with receiving image data originated by an image sensor; an image processing circuit configured to process the video frames of the video sequence; and a display processing circuit configured to detect faults in the video sequence in conjunction with interfacing the video sequence with a display device, the display processing circuit comprising: an image processor interface configured to receive pixel data for each video frame of the video sequence from the image processing circuit; a video processor configured to process the video frames of the video sequence; a display interface configured to provide the video sequence to the display device; and a fault detection circuit configured to detect faults in the video sequence, the fault detection circuit comprising: a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of the video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame; a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and a signature comparator configured to compare the current and reference frame signature values stored by the MSSB to determine if a fault condition exists for one or more frames in the video sequence.

BRIEF DESCRIPTION OF THE DRAWINGS

In the drawings, like reference numerals refer to like elements throughout, and the various features are not necessarily drawn to scale.

FIG. 7 is a block diagram of an exemplary embodiment of a multiple input signature register (MISR);

DETAILED DESCRIPTION

This disclosure describes various embodiments of a fault detection circuit for detecting faults in video frames of a video sequence by determining frame signatures and comparing a current frame signature to a reference frame signature. For example, the fault detection circuit may be used to detect freeze faults and/or data mismatch faults. The fault detection circuit may be part of a display processing circuit. The display processing circuit may be part of an integrated circuit. In an exemplary application, the fault detection circuit may be implemented in a vehicle in conjunction with video displays that assist operators in operation of the vehicle, such as for backing up, parking, passing, and checking blind spots.

In devices targeting automotive markets, especially for safety critical surround view and digital cluster system applications, it may be important that the image displayed on the screen, as seen by the driver, is the same as what was actually captured by the corresponding camera (e.g., front camera or back camera). An example is a system managing the rear-view in a car while the car is backing up. Here, the camera is capturing the rear of the car and the image is relayed on to the display, such as an LCD display, in a normal field of view of the driver. If the display freezes during this time, it can result in an accident. Therefore, systems that are designed for these markets may have an inbuilt mechanism by which such system faults, such as display frame freeze, may be detected and reported back to the user (i.e., driver) immediately.

In some examples, the systems described in this disclosure may include one or more of the following features: i) a data consistency monitor to verify if the intended data is shown correctly on the display and ii) a freeze frame detection to notify a possible frame freeze when there is no change in the display frame over a multiple frame periods.

Figure 1:
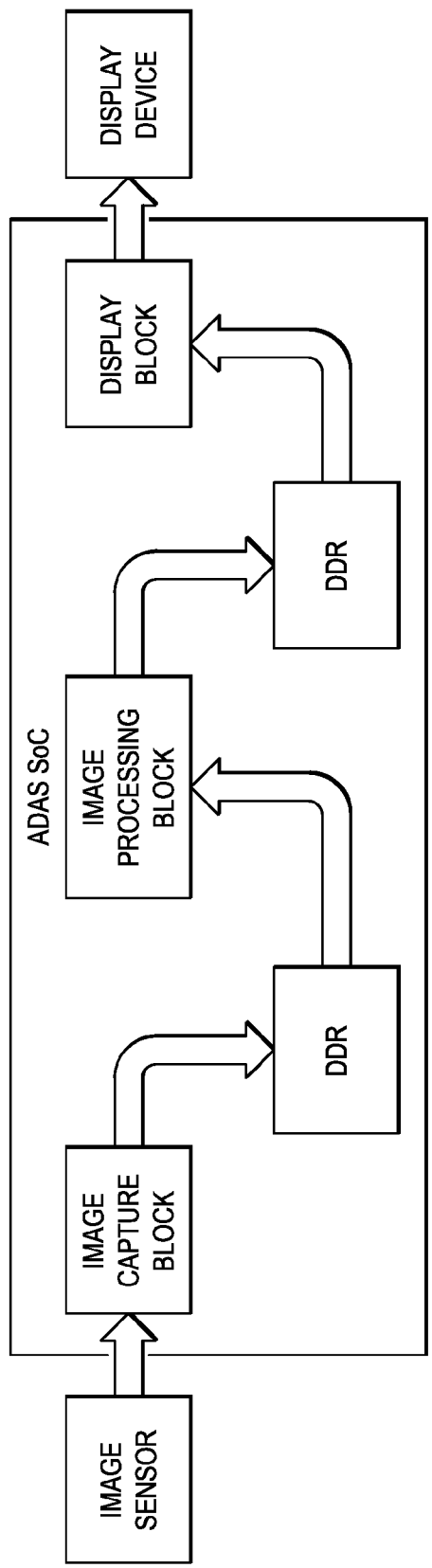
FIG. 1 is a video data flow diagram for an exemplary embodiment of an advanced driver assist system (ADAS) system-on-chip (SoC) in an exemplary video system.
Figure 2:
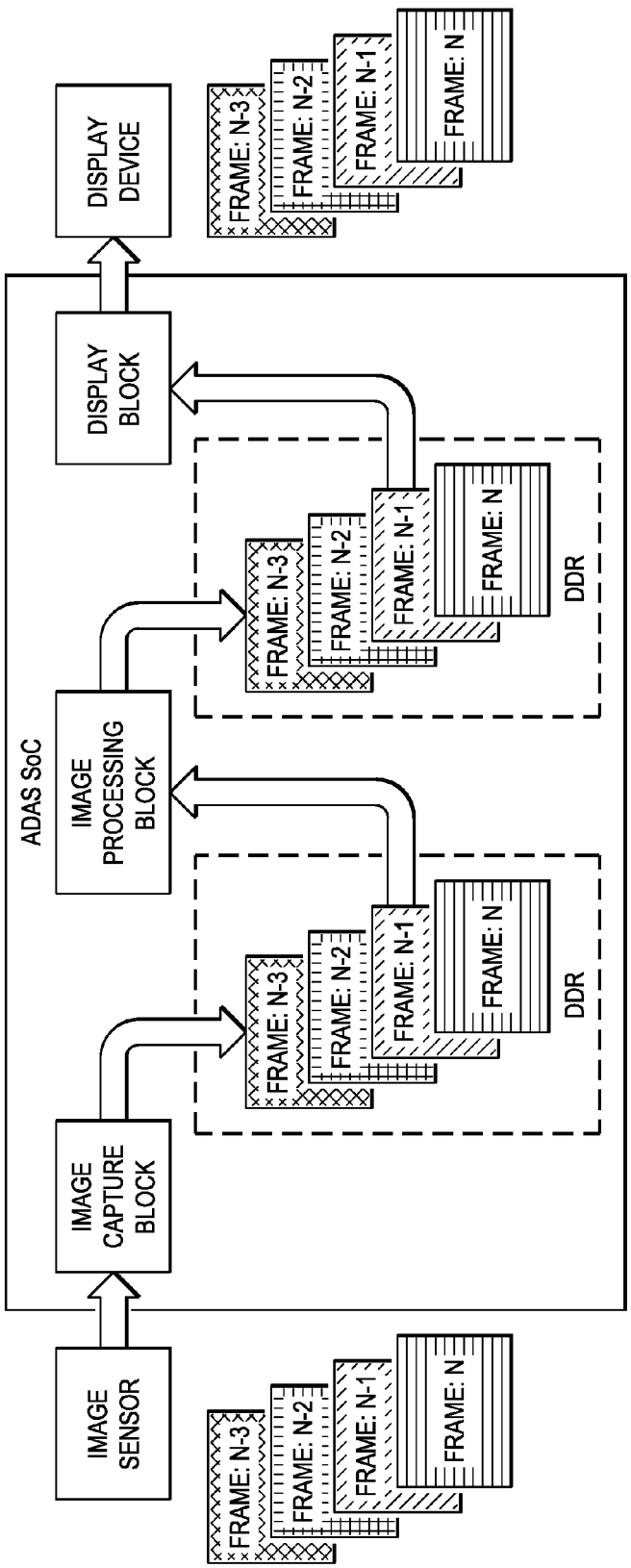
FIG. 2 is a video frame flow diagram for normal operation of the ADAS SoC of FIG. 1.

With reference to FIG. 1, a video flow diagram shows a data-flow for an exemplary embodiment of an advanced driver assist system (ADAS) system-on-chip (SoC) in an exemplary video system. The video flow diagram may be used in SoCs targeting the automotive markets mentioned above or other vehicle markets. The double data rate (DDR) memory in the flow diagram is where video frame data (such as R, G, B pixels) or other data is stored. When everything is working as expected, different frames captured by the image sensor results in different frames displayed on the display device. This is shown in the video frame flow diagram of FIG. 2 which depicts normal operation of the ADAS SoC. However, the ADAS SoC can malfunction in multiple ways.

Figure 3:
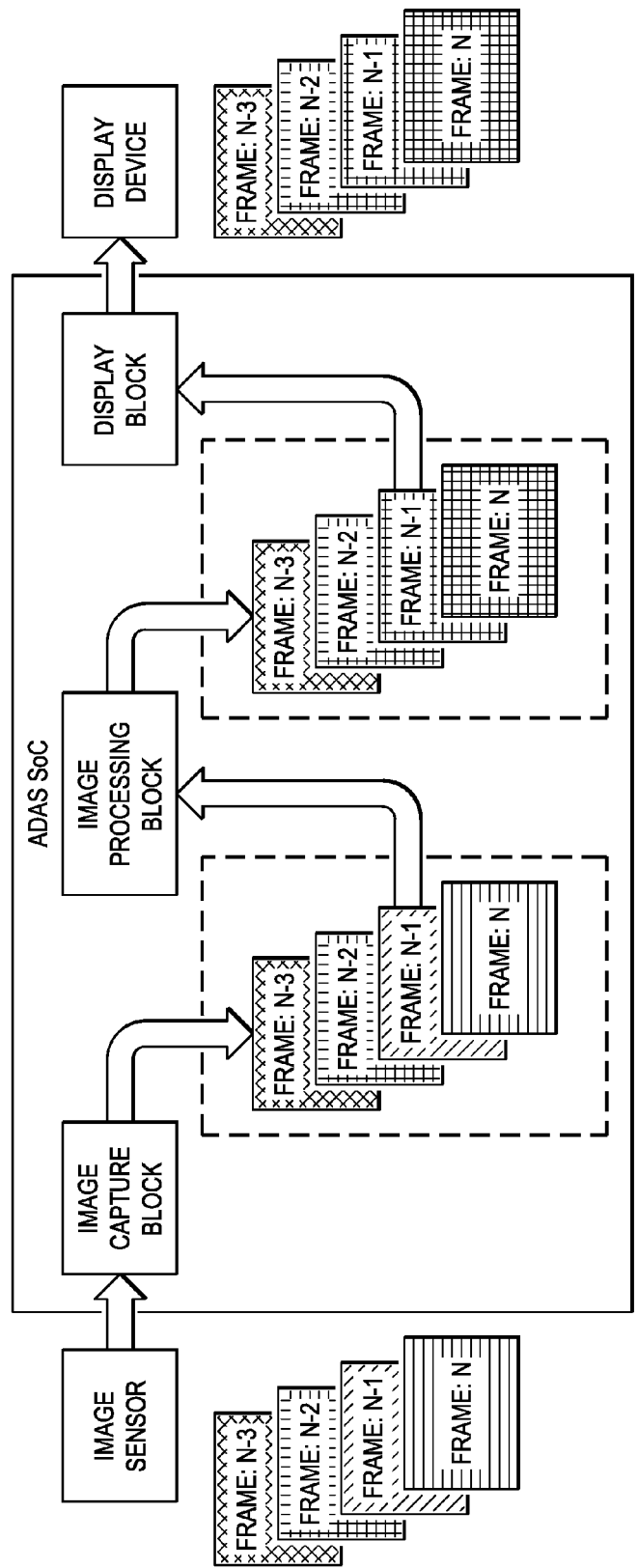
FIG. 3 is a video frame flow diagram for an exemplary freeze fault during operation of the ADAS SoC of FIG. 1.

With reference to FIG. 3, the ADAS SoC can experience a first type of frame-freeze fault. In this scenario, the same frame could be repeated on the display device due to: i) software not updating the base-address (BA) of the input to the image processing block which causes it to repeatedly process and output Frame N−2 to the display block; ii)

software not updating the BA of the input to the display block which causes the display block to repeatedly fetch Frame N−2 from the DDR memory even though the image processing block might have processed the next frames (i.e., Frame N−1 and Frame N) and made them available to the display block in the DDR memory; or iii) image processing block hardware or display block hardware are not synchronizing (i.e., updating) to the new BA even though the software has programmed the correct new BA.

Figure 4:
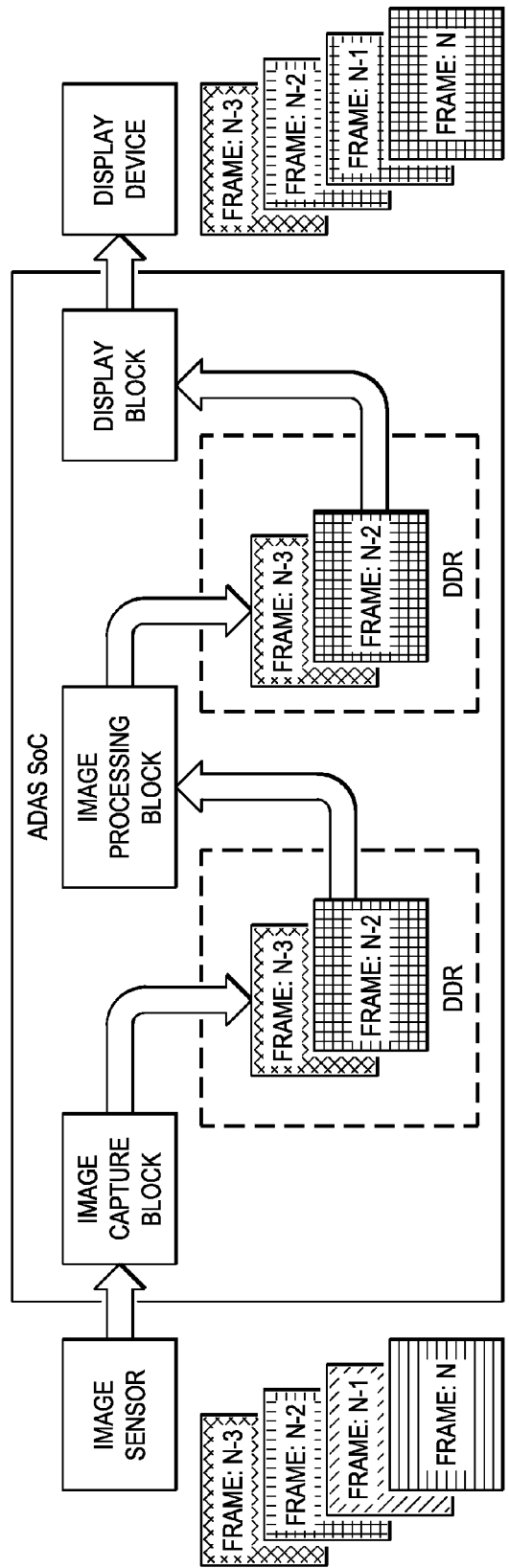
FIG. 4 is a video frame flow diagram for another exemplary freeze fault during operation of the ADAS SoC of FIG. 1.

With reference to FIG. 4, the ADAS SoC can experience a second type of frame freeze fault. In this scenario, the frame-freeze could occur because the image capture block got stuck and is not capturing new frames. Here, the image processing block and display block repeatedly process and store or display the same frame as though the capture were correct and the scene was not changing.

Figure 5:
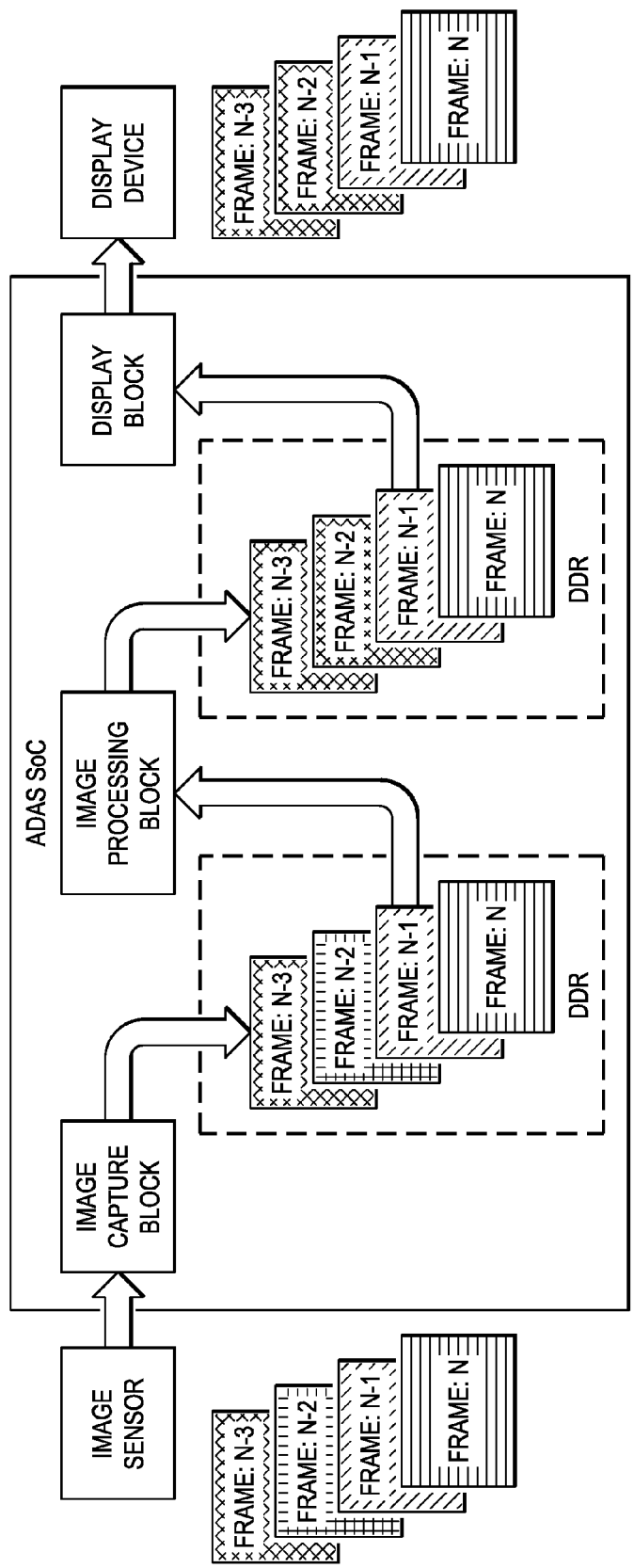
FIG. 5 is a video frame flow diagram for an exemplary data mismatch fault during operation of the ADAS SoC of FIG. 1.

With reference to FIG. 5, the ADAS SoC can experience a frame data mismatch fault. In this scenario, content displayed on the display device in a particular frame does not match what was captured by the image sensor for the corresponding frame and/or does not match content that was overlaid by the image processing block on that which was captured. For captured image content, this may occur because the image processing block or display block are operating at a slower speed in comparison to the image sensor and image capture block. For overlaid image content, this may occur because the display block is operating at a slower speed in comparison to the image processing block. Even though there is no frame freeze in this scenario, this is an undesirable condition because the user is not seeing content that is expected to be displayed on the display device.

These scenarios are just some of the ways that video processing can malfunction in the ADAS SoC and like video systems. Those of skill in the art will recognize and contemplate other fault scenarios not mentioned above in which similar malfunctions can result in undesirable and/or inaccurate content displayed on the display device.

In one embodiment, a fault detection circuit can collect signatures from predetermined or programmable frame regions within a video frame and compare the signature to reference signatures. The frame regions can be user-defined. When the frame region is associated with overlaid content, the reference signature can be predetermined or programmable and at least one of the overlaid content or the reference signature can be user-defined. When the frame region is associated with captured content, the reference signature is based on one or more previously saved signatures for the corresponding previous video frames. By comparing the current video frame signature with the previously saved signature(s), the fault detection circuit is able to detect frame-freeze faults within the video processing system. By comparing the current video frame signature with a predetermined or programmable reference signature, the fault detection circuit is able to detect a data mismatch fault within the video processing system. The signature for each frame region of each video frame is generated by a multiple input signature register (MISR) module.

Figure 6:
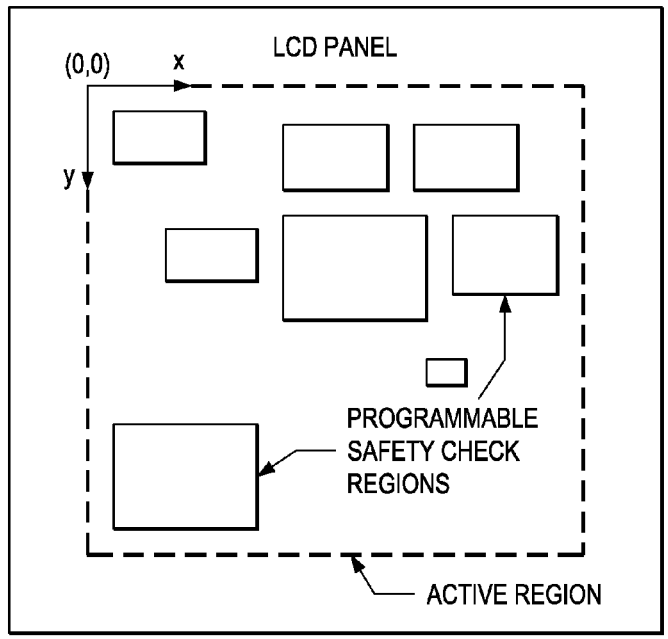
FIG. 6 is a video frame layout with exemplary frame regions selected for comparison in relation to a sequence of video frames.

With reference to FIG. 6, the display block output of the video processing system may allow the user to select one or more frame regions within the active video output area. Alternatively, the frame region may encompass the entire active video output area of the video frame. These frame regions may also be referred to as safety check regions because the corresponding video fault detection operations may be implemented as safety features in relation to the video processing system or the end product associated therewith. Each of the frame regions may be defined by the following parameters: i) position_x, position_y (x and y coordinates for the frame region within the active video output area of the video frame) and ii) width and height (dimensions of the frame region). Various other parameters for fault detection operations are configurable, including the following parameters: i) enable bit(s) (e.g., to enable freeze frame and/or data mismatch fault detection); ii) reference signature (for data mismatch fault detection); iii) freeze frame detection threshold (the number of times a frame is repeated before it is considered a freeze frame fault). If multiple frame regions are used, the multiple regions may be defined to be non-overlapping areas of the active video output area. The selection of overlapping frame regions is also permitted. When multiple frame regions are used, the fault detection circuit processes each frame region independently and preferably in parallel.

Each frame region is composed of width*height number of RGB pixels. For example, each pixel provided to the fault detection circuit may include 30 data bits, including 10 bits defining each of the R (red), G (green) and B (blue) color components for the pixel. In other embodiments, the pixels may be defined by any suitable number of data bits for color components, color characteristics, and grayscale characteristics for the corresponding pixel.

After a given frame region is defined, each pixel of the frame region for each video frame of a video sequence is passed to an MISR module like the exemplary embodiment shown in FIG. 7. In this embodiment, a 32-bit MISR with a 32-bit Galois linear feedback shift register (LFSR) and a tap polynomial defined by $P(x)=X^{32}+X^{22}+X^2+x+1$ is used to generate a signature from a predetermined sequence of pixel data for the pixels in the frame region. For example, the pixel data may include the ten most significant (MSB) bits of each color component for the corresponding pixel. The fault detection circuit may perform the signature generation algorithm below independently for each safety region of a video sequence, repeating certain aspects of the algorithm for each video frame of the video sequence:

```
MISR (32-bit Galois LFSR based) Signature Generation Algorithm
    Tap _polynomial = 32'hE000_0200
    lfsr_q = seed // initial lfsr value – any non-zero value
    For each ( pixel data in the safety region ) {
        data_in[31:0] = { 2'b0, r,g,b } // 10 MSB bits of R,G,B
        components
        lfsr_d = (data_in ^ (lfsr_q >> 1))
        If ( lfsr_q[0] ) lfsr_d = lfsr_d ^ Tap_polynomial
        lsfr_q = lfsr_d
    }
    signature = lfsr_q
```

A separate MISR operates for each frame region defined for the frame sequence. Thus, operation of one MISR is sufficient to understand how each MISR operates and how each frame region is processed. Each MISR is initialized at the beginning of each frame with a non-zero 'seed' value either by using the default constant value (0xFFFF_FFFF) or by being configured to use a programmable seed configuration value. The MISR starts operation at the beginning of the frame region (X0,Y0), where (X0, Y0) may correspond to a top-left coordinate of the frame region, and completes the operation at the end of the frame region (X1, Y1), where (X1, Y1) may correspond to the bottom-right coordinate of the sub-region. In other embodiments, the pixel sequence may correspond to any suitable sequence. For example, the pixel sequence may follow a raster scanning sequence used by the video processing system to process and display video frames.

At the end of the pixel sequence for the frame region, the 32-bit LFSR in the MISR module holds a signature for the frame region of the corresponding video frame. This current video frame signature will be dependent on the RGB content of the pixels in the frame region and the pixel sequence. For captured content, this current video frame signature may be compared to one or more previous video frame signatures to detect freeze frame faults. The amount of previous video frame signatures to which the current video frame signature is compared is based on the freeze frame detection threshold parameter. If the video frame signature is the same for more frames than the freeze frame detection threshold, this indicates a freeze frame fault condition exists. For overlaid image content, the current video frame signature may be compared to a predetermined frame signature associated with the overlaid image. If the current video frame signature does not match the predetermined frame signature, this indicates that a data mismatch fault condition exists.

Figure 8:
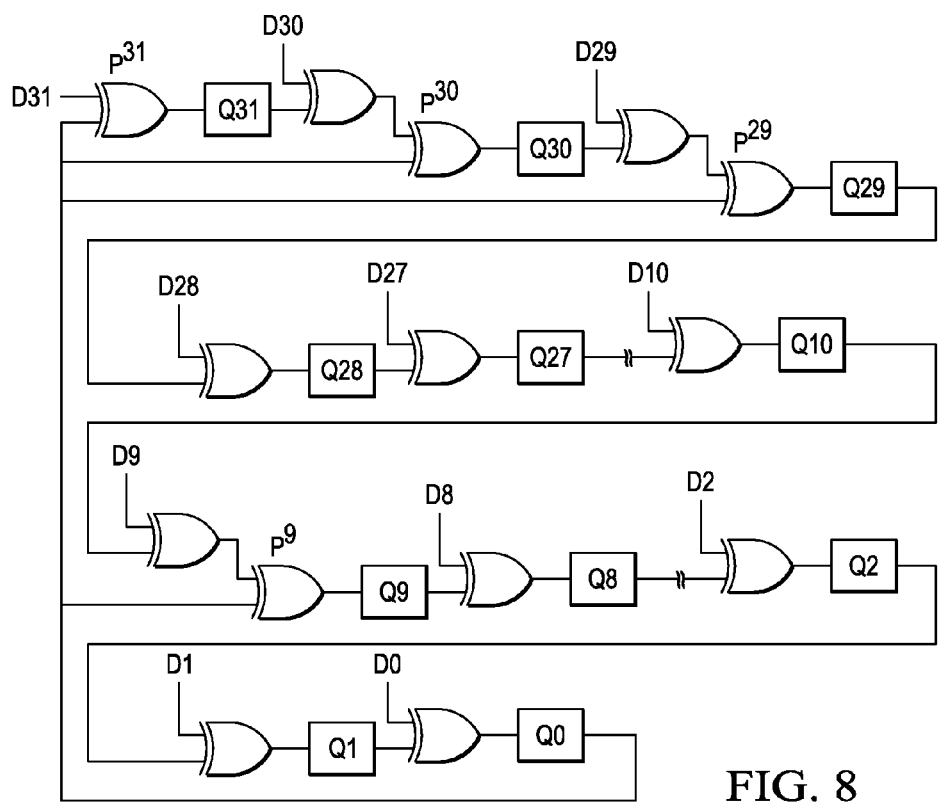
FIG. 8 is a block diagram of another exemplary embodiment of an MISR.

With reference to FIG. 8, a block diagram of another exemplary embodiment of an MISR shows how a 32-bit LFSR uses a serial arrangement of flip-flops and exclusive-OR gates to form the linear feedback associated with the shift register and additional exclusive-OR gates to establish the tap polynomial. The combined exclusive-OR gates provide parallel data inputs D0 . . . D31 to the MISR. After the pixel data for the last pixel of the frame region is processed by the MISR, the flip-flops Q0 . . . Q31 hold the frame signature value for the current video frame.

Figure 9:
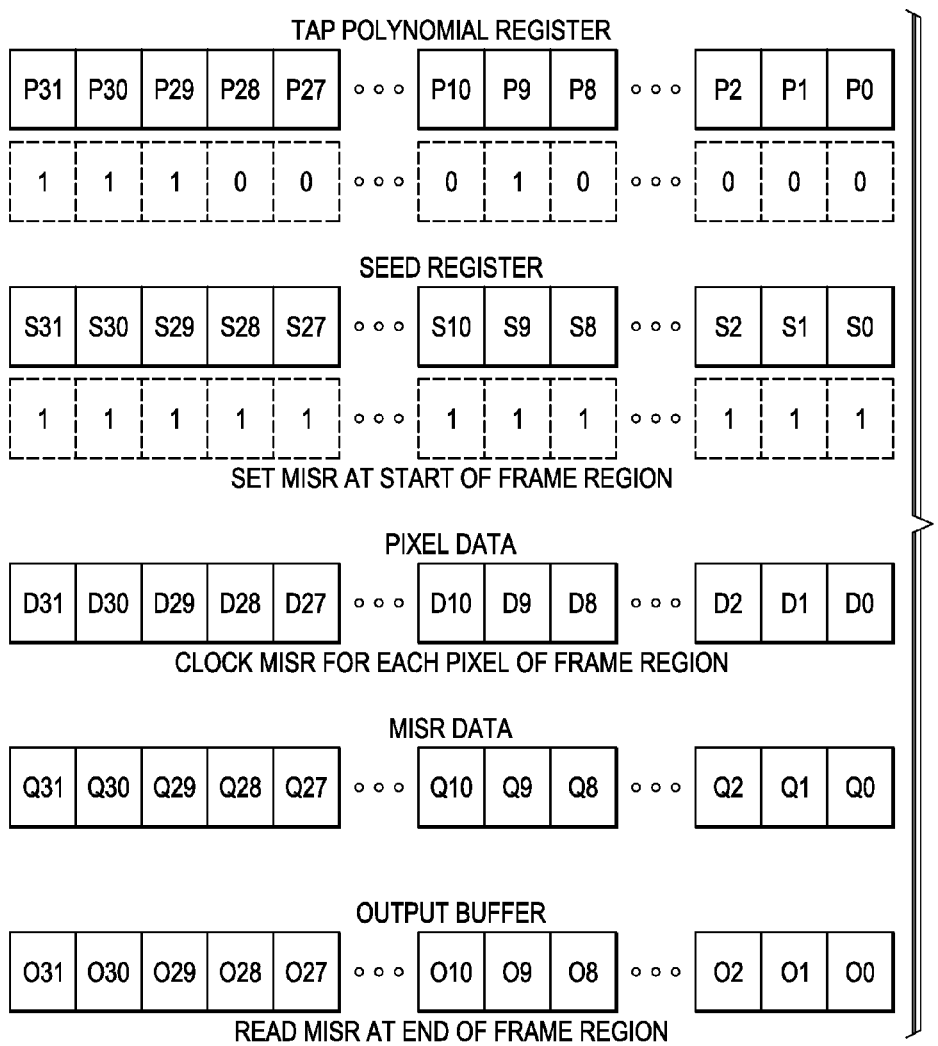
FIG. 9 is a diagram identifying data bits in various exemplary data registers, input data signals, and data storage components of an exemplary embodiment of an MISR.

With reference to FIG. 9, a diagram identifies the data bits in various exemplary data registers, input data signals, and data storage components of an exemplary embodiment of a MISR.

With reference to FIGS. 7-9, there is a small probability that two different frame regions with different RGB content may result in the same signature. However, this probability is very low, particularly for a 32-bit MISR. The probability that two different sub-regions with different RGB content can result in the same signature can be determined using an MISR aliasing (faulty signature matches fault-free signature) probability algorithm. For example, the MISR aliasing probability is $(2(L-n)-1)/(2L-1) = \sim 2(L-n)/2L = 2-n$ for large L, where n=length of signature register and L=length of input sequence. With this approximation algorithm, where n=4 the aliasing probability=6.25%, where n=16 the aliasing probably=0.0015%, and where n=32 (as in the exemplary embodiment described herein) the aliasing probability is $\sim 2^{-32}$ (negligible).

After the current video frame signature for a frame region is captured from the MISR module in a buffer or any suitable storage device, the fault detection circuit performs further processing to analyze the current video frame signature for one or more types of faults.

If data mismatch fault detection is enabled, after a new video frame signature is generated, it is compared against a predetermined signature associated with an overlaid image in the corresponding video frame of the video sequence. The frame region is selected to include at least a portion of the overlaid image and the predetermined signature is based on an expected signature for the corresponding portion of the overlaid image. If the current video frame signature does not match the predetermined signature, an interrupt event is generated to indicate a data mismatch fault condition exists.

If freeze frame fault detection is enabled, after a new video frame signature is generated, it is compared to a previous video frame signature that was generated for a previous video frame and saved in the buffer or any suitable storage device for subsequent comparisons. If the current video frame signature matches the previous video frame signature, an internal counter used to keep track of the number of video frames with the same signature for the frame region is incremented. If the current video frame signature does not match, the counter is cleared. If the counter value is greater than a freeze frame detection threshold parameter value, an interrupt event is generated to indicate a freeze frame condition exists. After the comparison, the current video frame signature is saved as the previous video frame signature and the process continues with generating a video frame signature for the next video frame. The counter is cleared when the interrupt event is generated or when freeze frame detection is disabled.

These two safety checks (i.e., freeze frame fault detection and data mismatch fault detection) may be continuously performed over multiple video frames of a video sequence as long as the corresponding mode enable bits are set. The generated fault interrupts may be fed to operational software associated with the video processing system. The video processing system may alert the user about the fault condition via a video overlay or any suitable alarm. The video processing system may also implement corrective actions to mitigate or eliminate the fault.

Figure 10:
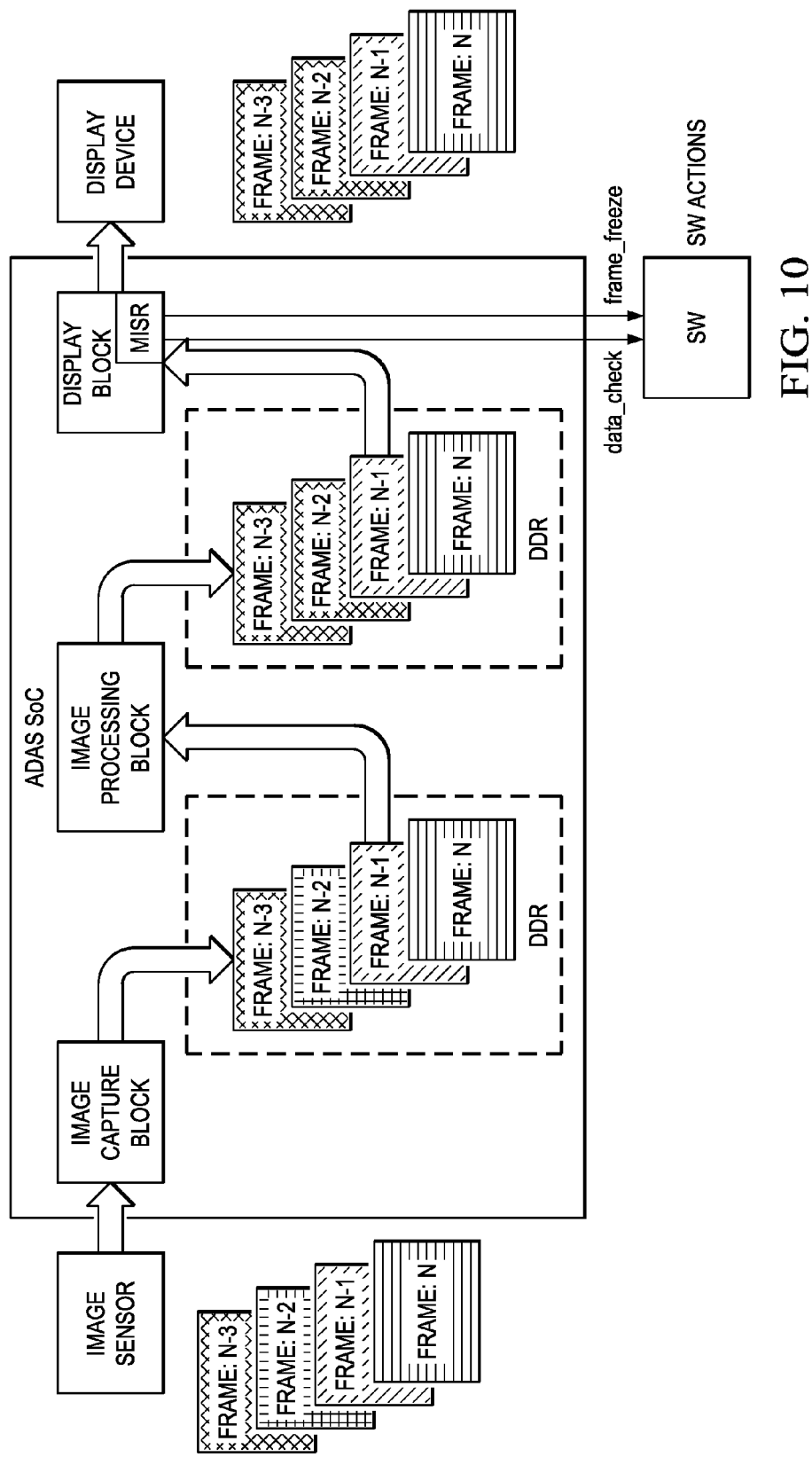
FIG. 10 is a video data flow diagram for an exemplary ADAS SoC with an exemplary embodiment of an MISR in an exemplary video system.

The various embodiments of the fault detection circuit described herein can be implemented in hardware with very little software intervention. For example, use of software may, in some examples, be limited to managing the fault interrupts after detection of frame freeze or data mismatch faults as shown in FIG. 10. Therefore, the various embodiments of the fault detection circuit have less latency (delay) in detecting frame freeze or data mismatch faults, less DDR bandwidth usage, and less power consumption.

Figure 11:
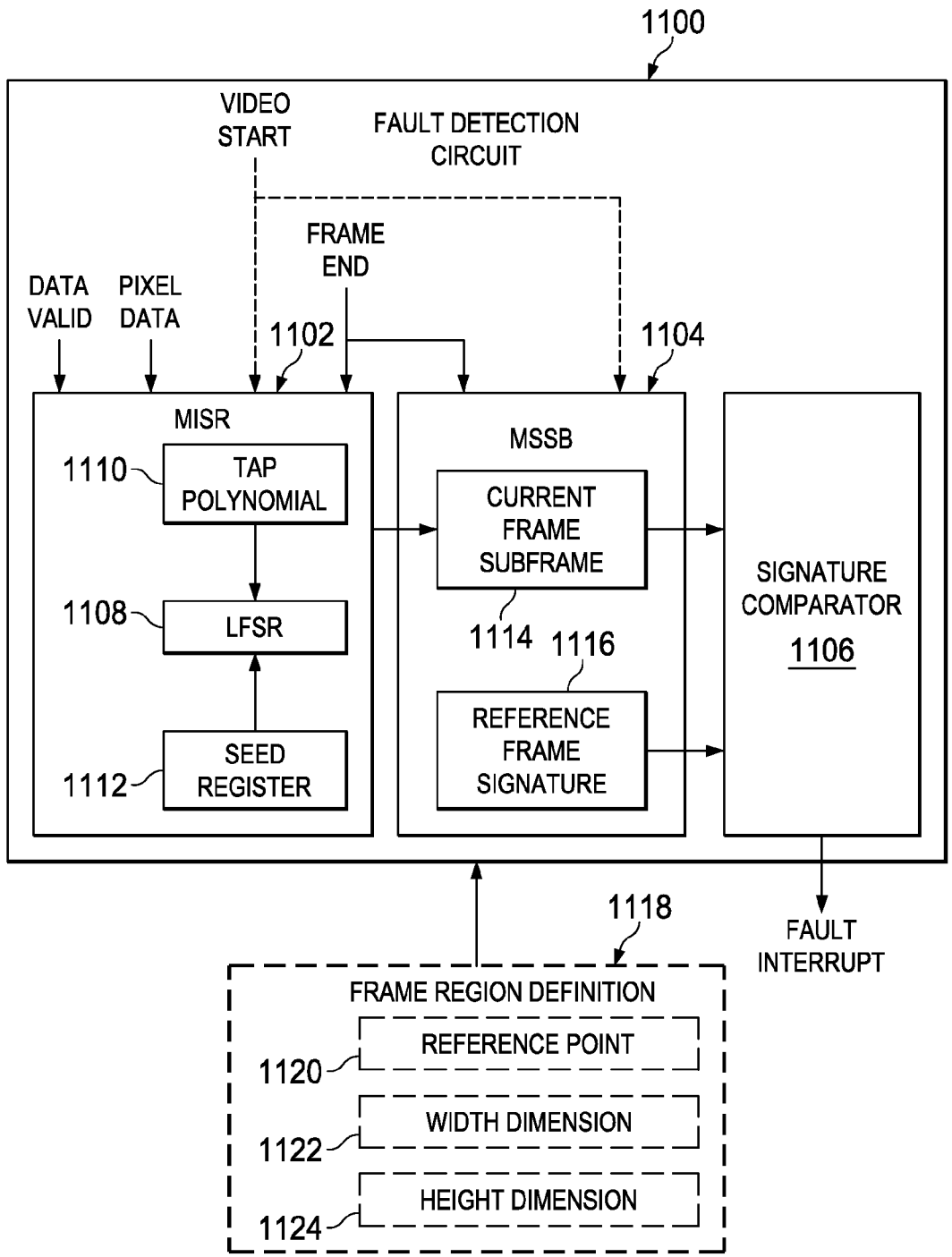
FIG. 11 is a block diagram of an exemplary embodiment of a fault detection circuit.

With reference to FIG. 11, a fault detection circuit 1100 for detecting faults in a video sequence includes a multiple input signature register (MISR) 1102, a multiple signature storage buffer (MSSB) 1104, and a signature comparator 1106. The MISR 1102 includes a linear feedback shift register (LFSR) 1108 with a tap polynomial 1110 and a seed register 1112. The tap polynomial 1110 includes a predetermined or programmable value that may be stored in a memory device, a storage register, or any suitable storage device. The MISR 1102 is configured to sequentially receive multiple bits of pixel data for each pixel in a predetermined or programmable frame region 1118 for each video frame of a video sequence. The MISR 1102 is configured to receive a data valid signal at a clock input to the MISR 1102 in conjunction with each pixel in the predetermined or programmable frame region 1118. The data valid signal causes the MISR 1102 to read the corresponding pixel data along with shifting data stored in the MISR 1102. The data valid signal is activated to indicate the pixel data is ready to be clocked into the MISR 1102. The data valid signal, for example, may be provided by a video processor (see FIG. 14, item 1442) or any suitable source from which the pixel data is received. The clock input to the MISR 1102 is a clocking or latching input to flip-flops or other suitable storage devices used in the MISR 1102 for storage of the data resulting from the input pixel data and the shifting action associated with the linear feedback. The MISR 1102 is configured to hold a frame signature value for the predetermined or programmable frame region 1118 of each video frame in conjunction with receiving a frame end signal for the corresponding video frame. The number of bits stored in the MISR 1102 (e.g., see FIG. 9, MISR DATA) is based on the number of bits expected in the pixel data. The MISR 1102 uses flip-flops or other suitable storage devices to store the bits. A parallel readout of the bits stored in the MISR 1102 provides the frame signature value after the sequence of pixel data for the pixels in the frame region 1118 is complete. Activation of the frame end signal tells the MISR 1102 and MSSB 1104 that the sequence of pixel data for the pixels in the frame region 1118 is complete. The MSSB 1104 is configured to store at least two frame signature values 1114, 1116. The MSSB 1104 is configured to store a current frame signature value 1114 held by the MISR 1102 in conjunction with receiving the frame end signal for the corresponding video frame. The MS SB 1104 is configured to store a reference frame signature value 1116 related to the current frame signature value 1114 for subsequent comparison. The signature comparator 1106 is configured to compare the current and reference frame signature values 1114, 1116 stored by the MSSB 1104 to determine if a fault condition exists for one or more frames in the video sequence.

In another embodiment of the fault detection circuit 1100, the MISR 1102 is configured for 32-bit parallel input operation in relation to the multiple bits of pixel data and 32-bit parallel output operation in relation to the frame signature value 1114. In other embodiments, the MISR 1102 may be configured for any suitable number of bits for parallel input and output operation.

In yet another embodiment of the fault detection circuit 1100, the predetermined or programmable tap polynomial 1110 for the MISR 1102 is defined by a P(x) function where $P(x)=x^{32}+x^{22}+x^2+x+1$. In other embodiments, the predetermined or programmable tap polynomial may be defined by any suitable P(x) function.

In still another embodiment of the fault detection circuit 1100, the multiple bits of pixel data include up to ten (10) most significant bits (MSB) of each color component for the corresponding pixel. In other embodiments, the multiple bits of pixel data may include any suitable combination of bits for color components, color characteristics, and grayscale characteristics for the corresponding pixel.

In still yet another embodiment of the fault detection circuit 1100, the MISR 1102 is configured to load a non-zero seed value in the seed register 1112 for processing each video frame of the video sequence in conjunction with receiving a video start signal for the video sequence and in conjunction with receiving frame end signals for each video frame. In a further embodiment, the MISR 1102 is configured to receive the video start signal from an image processing circuit (see FIG. 16).

In another embodiment of the fault detection circuit 1100, the predetermined or programmable frame region 1118 for each video frame of the video sequence includes all pixels for the corresponding video frame.

In yet another embodiment of the fault detection circuit 1100, the predetermined or programmable frame region 1118 is defined by a reference point 1120 identified by horizontal and vertical coordinates in relation to the video frame, a width dimension 1122 in relation to the reference pixel, and a height dimension 1124 in relation to the reference pixel. In a further embodiment, the predetermined or programmable frame region 1118 is selected by a user at an input device (see FIG. 16) and the reference point 1120, width dimension 1122, and height dimension 1124 are originated by the input device and received by the fault detection circuit 1100. In another further embodiment, the reference point 1120, width dimension 1122, and height dimension 1124 for the predetermined or programmable frame region 1118 are predetermined or programmable parameters stored in a storage device (see FIG. 16) and retrieved from the storage device.

Figure 16:
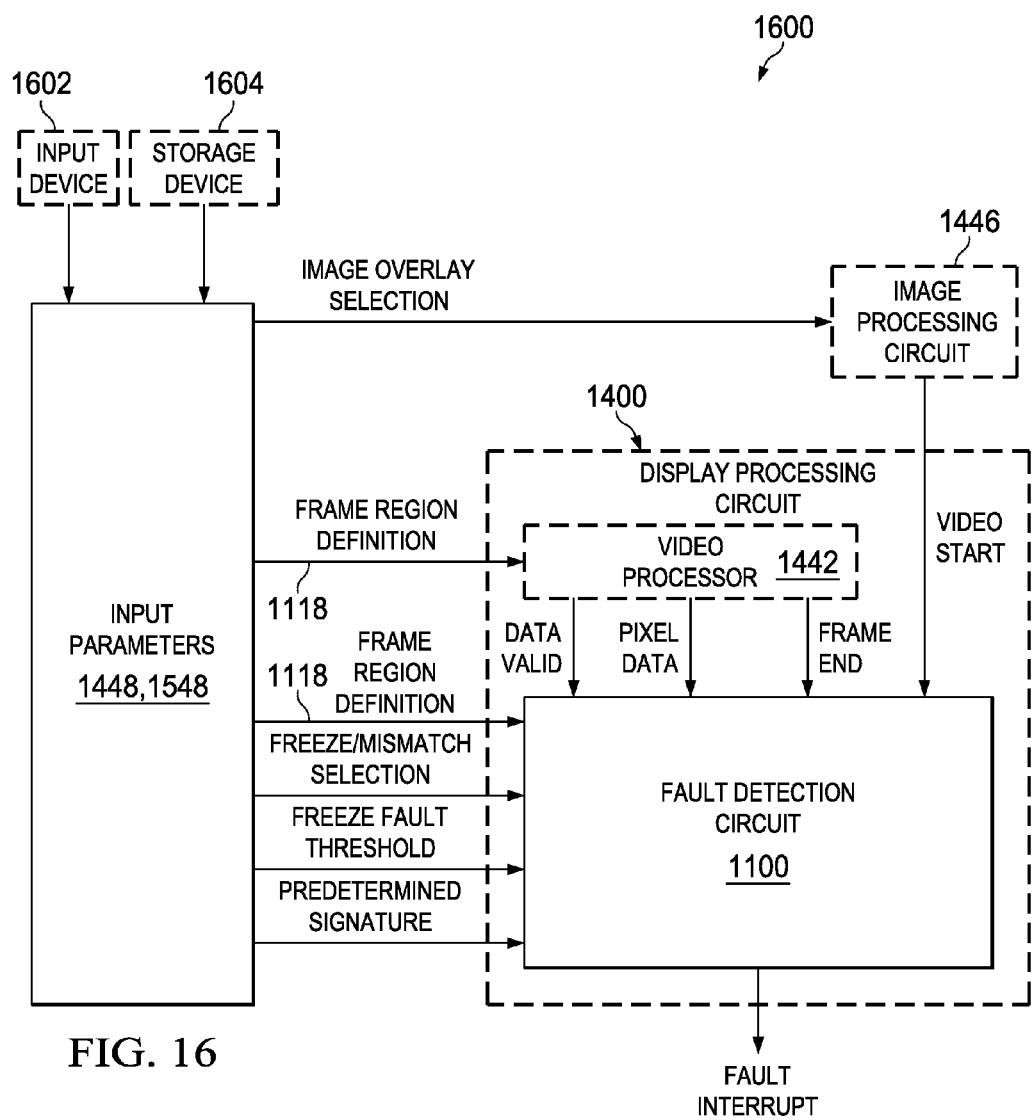
FIG. 16 is a block diagram showing various input parameters and control signals associated with the fault detection circuit of FIG. 13, the display processing circuit of FIG. 14, and the integrated circuit of FIG. 15.

In still another embodiment of the fault detection circuit 1100, the MISR 1102 is configured to receive the multiple bits of pixel data, the data valid signal, and the frame end signal from a video processor (see FIG. 16).

In still yet another embodiment of the fault detection circuit 1100, the MISR 1102 is configured to sequentially receive the multiple bits of pixel data for each pixel in the predetermined or programmable frame region 1118 of each video frame based on a predetermined or programmable pixel scan sequence that is repeated for each video frame.

In another embodiment of the fault detection circuit 1100, the MSSB 1104 is configured to clear storage locations 1114, 1116 for frame signature values in conjunction with receiving a video start signal for the video sequence. In a further embodiment, the MSSB 1104 is configured to receive the video start signal from an image processing circuit (see FIG. 16).

Figure 12:
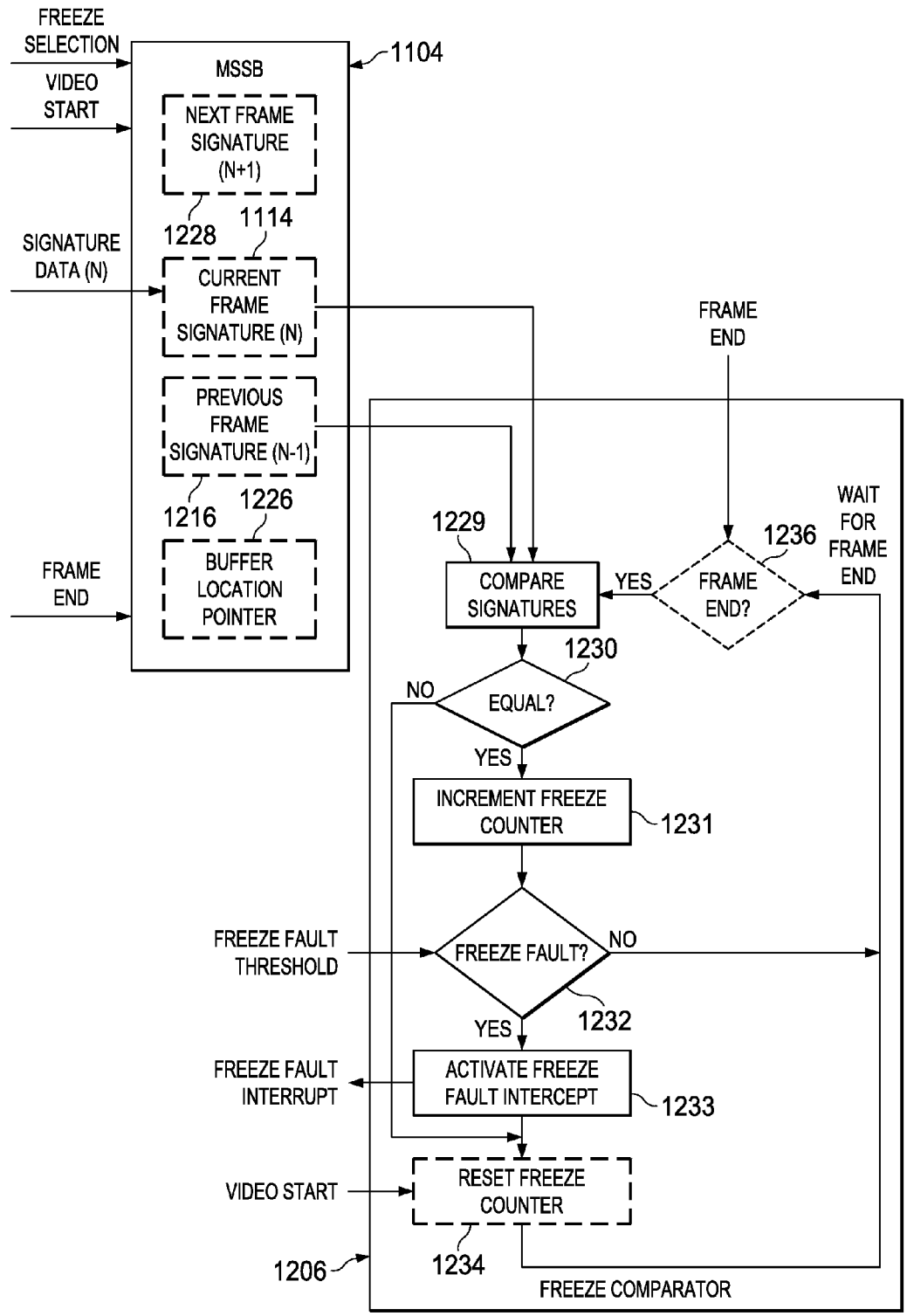
FIG. 12, in combination with FIG. 11, is a block diagram of another exemplary embodiment of a fault detection circuit.

With reference to FIGS. 11 and 12, in yet another embodiment of the fault detection circuit 1100, the MSSB 1104 is configured to be enabled for freeze fault detection in conjunction with receiving a freeze selection signal. In a further embodiment, the freeze fault detection is selected by a user at an input device (see FIG. 16) and the freeze selection signal is originated by the input device. In another further embodiment, the freeze selection signal is a predetermined or programmable parameter stored in a storage device (see FIG. 16) and retrieved from the storage device.

With continued reference to FIGS. 11 and 12, in still another embodiment of the fault detection circuit 1100, in conjunction with freeze fault detection, the reference frame signature value 1116 is a previous frame signature value 1216 held by the MISR 1102 after receiving a previous frame end signal for a corresponding previous video frame, and the previous frame signature value 1216 has been held by the MISR 1102 after sequentially clocking the multiple bits of pixel data for each pixel in the predetermined or programmable frame region 1118 for the corresponding previous video frame through the MISR 1102.

In still yet another embodiment of the fault detection circuit 1100, the MSSB 1104 is configured to increment a buffer location pointer 1226 in conjunction with receiving the frame end signal to prepare for storage of a next frame signature value 1228 held by the MISR 1102 after receiving a next frame end signal for a corresponding next video frame.

In another embodiment of the fault detection circuit 1100, the signature comparator 1106 includes a freeze comparator 1206 is configured to compare 1229 the current and previous frame signature values 1114, 1216. The freeze comparator 1206 is configured to increment a freeze counter 1231 after determining that the current and previous frame signature values 1114, 1216 are equal 1230 and to compare the freeze counter to a predetermined or programmable freeze fault threshold 1232. The freeze comparator 1206 is configured to activate a freeze fault interrupt 1233 after and/or in response to determining that the freeze counter exceeds the predetermined or programmable freeze fault threshold 1232. In some examples, the freeze comparator 1206 may not activate the freeze fault interrupt 1233 in response to determining that the freeze counter does not exceed the predetermined or programmable freeze fault threshold 1232.

In a further embodiment of the fault detection circuit 1100, the freeze comparator 1206 is configured to reset the freeze counter 1234 in conjunction with receiving a video start signal for the video sequence. In another further embodiment of the fault detection circuit 1100, the freeze comparator 1206 is configured to reset the freeze counter 1234 after determining that the current and previous frame signature values are not equal 1230. In yet another further embodiment of the fault detection circuit 1100, the freeze comparator 1206 is configured to reset the freeze counter 1234 after activating the freeze fault interrupt 1233.

In still another further embodiment of the fault detection circuit 1100, the freeze comparator 1206 is configured to compare 1229 the current frame signature value 1114 with a next frame signature value 1228 after determining that the freeze counter does not exceed the predetermined or programmable freeze fault threshold 1232 in conjunction with receiving the frame end signal associated with the current frame signature 1236. In still yet another further embodiment of the fault detection circuit 1100, the freeze comparator 1206 is configured to compare 1229 the current frame signature value 1114 with a next frame signature value 1228 after resetting the freeze counter 1234 in conjunction with receiving the frame end signal associated with the current frame signature 1236.

In another further embodiment of the fault detection circuit 1100, the freeze fault interrupt is indicative of a freeze fault condition during the video sequence. In yet another further embodiment of the fault detection circuit 1100, the freeze fault interrupt triggers at least one of adding an image overlay to subsequent frames of the video sequence to provide notice of the freeze fault condition, activating an alarm to provide notice of the freeze fault condition, and initiating a freeze fault recovery operation to correct the freeze fault condition for the video sequence.

Figure 13:
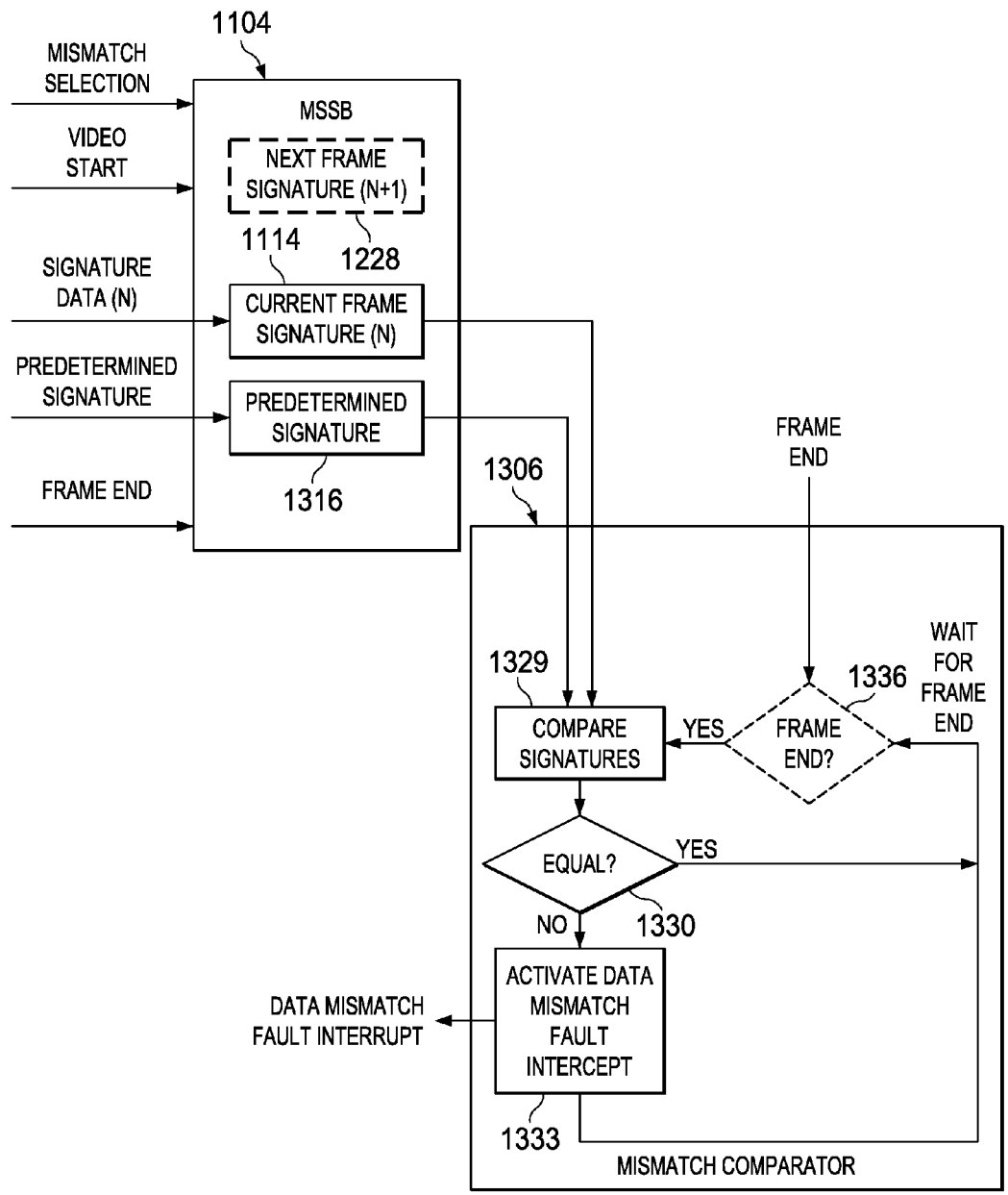
FIG. 13, in combination with FIG. 11, is a block diagram of yet another exemplary embodiment of a fault detection circuit.

With reference to FIGS. 11 and 13, in yet another embodiment of the fault detection circuit 1100, the MSSB 1104 is configured to be enabled for data mismatch fault detection in conjunction with receiving a mismatch selection signal. In a further embodiment, the data mismatch fault detection is selected by a user at an input device (see FIG. 16) and the mismatch selection signal is originated by the input device. In another further embodiment, the data mismatch fault detection is a predetermined or programmable parameter stored in a storage device (see FIG. 16) and retrieved from the storage device.

With continued reference to FIGS. 11 and 13, in still another embodiment of the fault detection circuit 1100, in conjunction with data mismatch fault detection, the reference frame signature value 1116 is a predetermined or programmable signature value 1316 associated with an image overlay (see FIG. 15) added to the video frame of the video sequence associated with the current frame signature value 1114. The predetermined or programmable frame region 1118 is selected to match the image overlay (see FIG. 15) such that the current frame signature value 1114 is expected to match the predetermined or programmable signature value 1316.

In still yet another further embodiment of the fault detection circuit 1100, the MSSB 1104 is configured to store the predetermined or programmable signature value 1316 in response to receiving a video start signal for the video sequence. In a further embodiment, at least one of the image overlay (see FIG. 15) and the predetermined or programmable signature value 1316 is selected by a user at an input device (see FIG. 16) and the predetermined or programmable signature value 1316 is originated by the input device. In another further embodiment, the predetermined or programmable signature value 1316 is a predetermined or programmable parameter stored in a storage device (see FIG. 16) and retrieved from the storage device.

In another embodiment of the fault detection circuit 1100, the signature comparator 1106 includes a mismatch comparator 1306 is configured to compare 1329 the current and predetermined or programmable frame signature values 1114, 1316. The mismatch comparator 1306 is configured to activate a data mismatch fault interrupt 1333 after determining the current and predetermined or programmable frame signature values 1114, 1316 are not equal 1330.

In a further embodiment of the fault detection circuit 1100, the mismatch comparator 1306 is configured to compare 1329 the predetermined or programmable frame signature value 1316 with a next frame signature value 1228 after determining the current and predetermined or programmable frame signature values 1114, 1316 are equal 1330 in response to receiving the frame end signal associated with the current frame signature 1336. In another further embodiment of the fault detection circuit 1100, the mismatch comparator 1306 is configured to compare the predetermined or programmable frame signature value 1316 with a next frame signature value 1228 after activating the data mismatch fault interrupt 1333 in conjunction with receiving the frame end signal associated with the current frame signature 1336.

In yet another further embodiment of the fault detection circuit 1100, the data mismatch fault interrupt is indicative of a data mismatch fault condition during the video sequence. In still another further embodiment of the fault detection circuit 1100, the data mismatch fault interrupt triggers at least one of adding an image overlay to subsequent frames of the video sequence to provide notice of the data mismatch fault condition, activating an alarm to provide notice of the data mismatch fault condition, and initiating a data mismatch fault recovery operation to correct the data mismatch fault condition for the video sequence.

Figure 14:
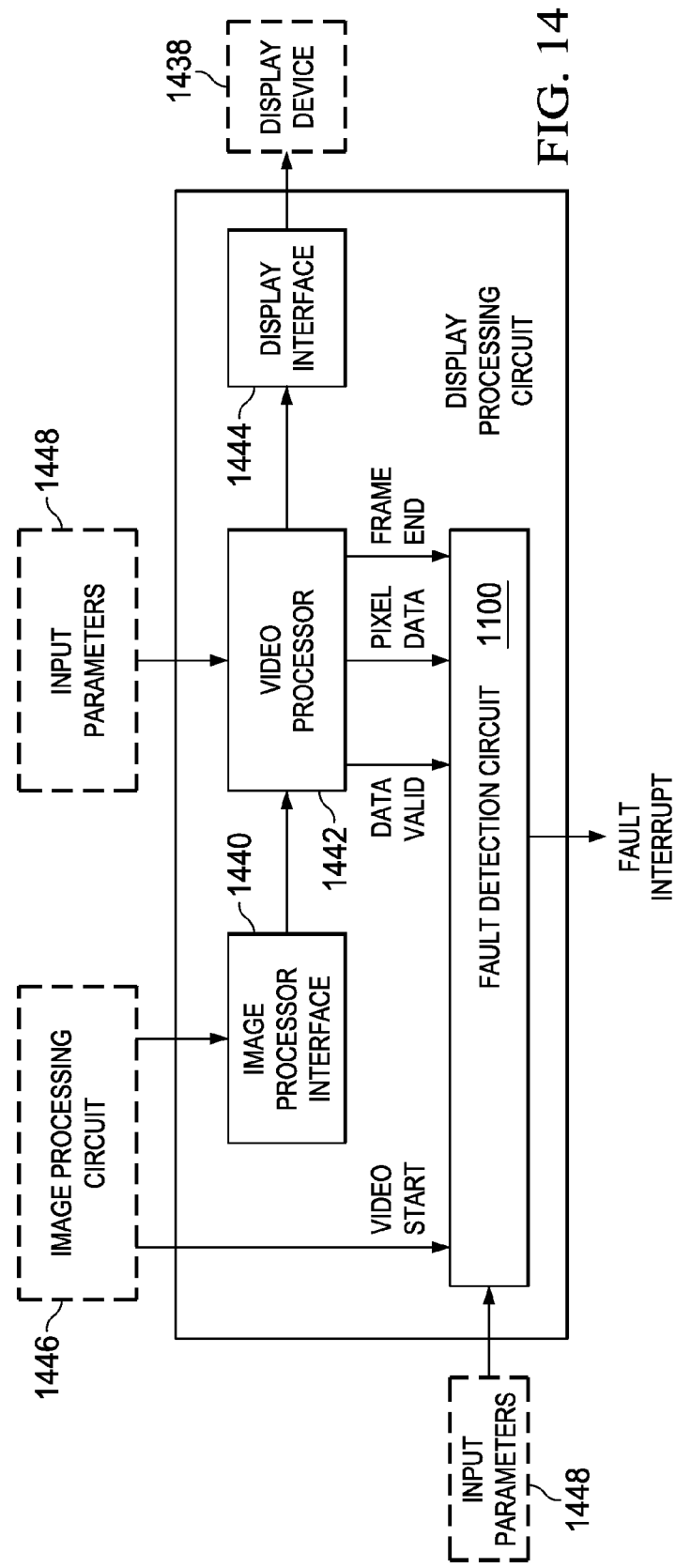
FIG. 14 is a block diagram of an exemplary embodiment of a display processing circuit that includes the fault detection circuit of FIG. 13.

With reference to FIG. 14, a display processing circuit 1400 for detecting faults in a video sequence in conjunction with interfacing the video sequence with a display device 1438 is shown. The display processing circuit 1400 includes an image processor interface 1440, a video processor 1442, a display interface 1444, and a fault detection circuit 1100. The image processor interface 1440 is configured to receive pixel data for each video frame of a video sequence from an image processing circuit 1446 and provide the pixel data to the video processor 1442. The video processor 1442 is configured to process the video frames of the video sequence to generate a processed video sequence. The video processor 1442 may process the video frames based on one or more input parameters 1448. The display interface 1444 is configured to provide the video sequence from the video processor 1442 to a display device 1438. The fault detection circuit 1100 is configured to detect faults in the video sequence. The image processing circuit 1444 may generate a video start signal indicative of the start of a sequence of video frames. The video processor 1442 may generate a data valid signal indicative of pixel data for a current pixel being valid and ready to be read. The video processor 1442 may generate a frame end signal indicative of completion of processing for the current video frame, including processing of all pixels in a specific frame region of the current video frame.

With reference to FIGS. 11 and 14, the fault detection circuit 1100 includes a multiple input signature register (MISR) 1102, a multiple signature storage buffer (MSSB) 1104, and a signature comparator 1106. The MISR 1102 includes a linear feedback shift register (LFSR) 1108 with a predetermined or programmable tap polynomial 1110 and a seed register 1112. The MISR 1102 is configured to sequentially receive multiple bits of pixel data for each pixel in a predetermined or programmable frame region 1118 for each video frame of the video sequence. The MISR 1102 is configured to receive a data valid signal at a clock input to the MISR 1102 in conjunction with each pixel in the predetermined or programmable frame region 1118. The data valid signal causes the MISR 1102 to read the corresponding pixel data along with shifting data stored in the MISR 1102. The MISR 1102 is configured to hold a frame signature value for the predetermined or programmable frame region 1118 of each video frame in conjunction with receiving a frame end signal for the corresponding video frame. The MSSB 1104 is configured to store at least two frame signature values 1114, 1116. The MSSB 1104 is configured to store a current frame signature value 1114 held by the MISR 1102 in response to receiving the frame end signal for the corresponding video frame. The MSSB 1104 is configured to store a reference frame signature value 1116 related to the current frame signature value 1114 for subsequent comparison. The signature comparator 1106 is configured to compare the current and reference frame signature values 1114, 1116 stored by the MSSB 1104 to determine if a fault condition exists for one or more frames in the video sequence.

With continued reference to FIGS. 11 and 14 and further reference to FIGS. 12 and 13, various embodiments of the fault detection circuit 1100 in the display processing circuit 1400 operate in the same manner as described above for the fault detection circuit 1100 of FIG. 11, including the various embodiments of the fault detection circuit 1100 for freeze fault detection (see FIG. 12) and for data mismatch fault detection (see FIG. 13). The input parameters 1448 received by the video processor 1442 may include the frame region definition 1118. The input parameters 1448 received by the fault detection circuit 1100 may include the frame region definition 1118, the freeze/mismatch selection signals (see FIGS. 12, 13), the predetermined or programmable freeze fault threshold (see FIG. 12), and the predetermined or programmable signature value (see FIG. 13).

Figure 15:
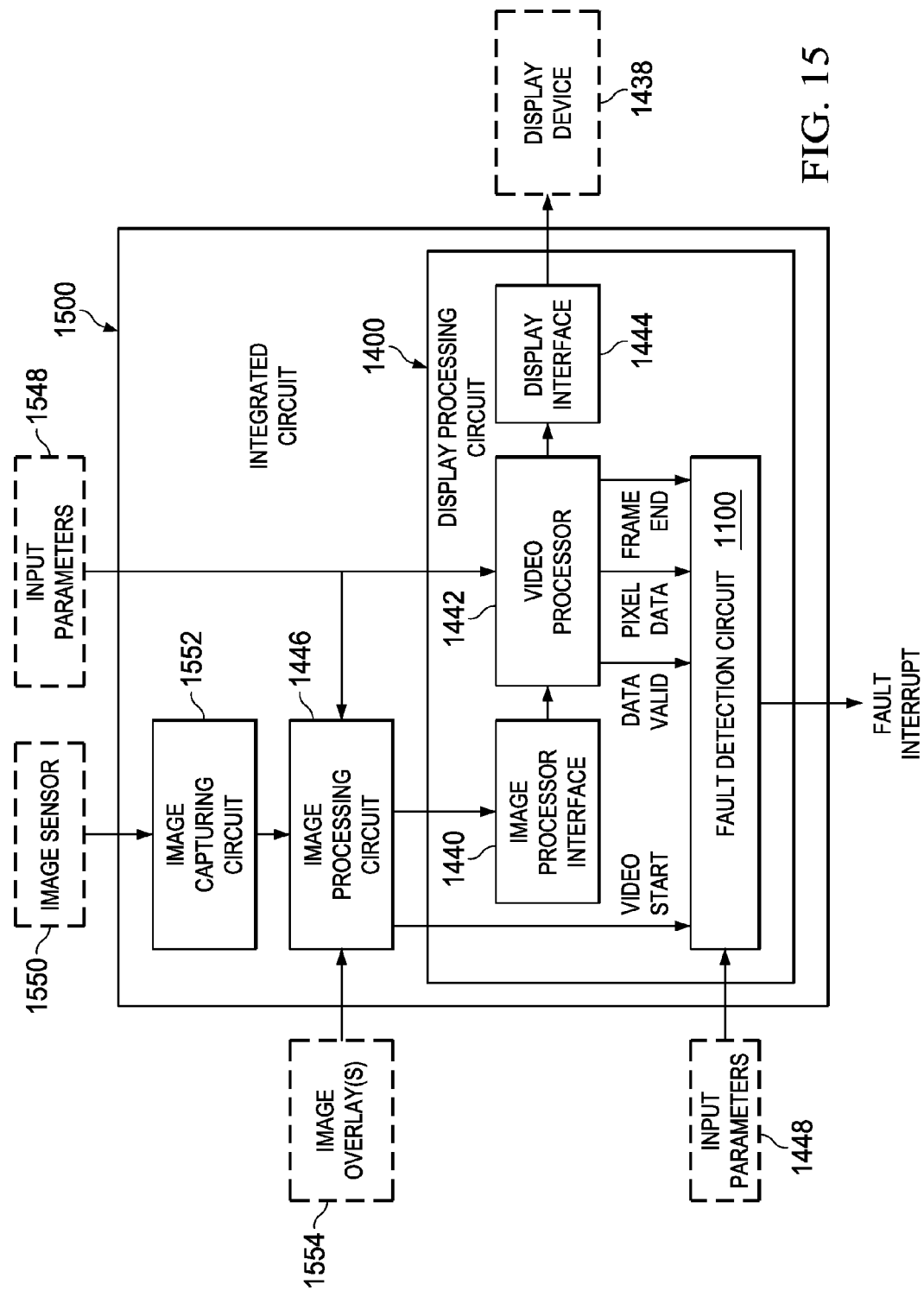
FIG. 15 is a block diagram of an exemplary embodiment of an integrated circuit that includes the display processing circuit of FIG. 14.

With reference to FIG. 15, an integrated circuit 1500 for detecting faults in a video sequence in conjunction with interfacing an image sensor 1550 with a display device 1438. The integrated circuit 1500 includes an image capturing circuit 1552, an image processing circuit 1446, and a display processing circuit 1400. The image capturing circuit 1552 is configured to form a video sequence of video frames in conjunction with receiving image data originated by an image sensor 1550. The image processing circuit 1446 is configured to process the video frames of the video sequence. The display processing circuit 1400 is configured to detect faults in the video sequence in conjunction with interfacing the video sequence with a display device 1438. The display processing circuit 1400 includes an image processor interface 1440, a video processor 1442, a display interface 1444, and a fault detection circuit 1100. The image processor interface 1440 is configured to receive pixel data for each video frame of the video sequence from the image processing circuit 1446. The video processor 1442 is configured to process the video frames of the video sequence. The display interface 1444 is configured to provide the video sequence to the display device 1438. The fault detection circuit 1100 is configured to detect faults in the video sequence.

With reference to FIGS. 11 and 15, the fault detection circuit 1100 includes a multiple input signature register (MISR) 1102, a multiple signature storage buffer (MSSB) 1104, and a signature comparator 1106. The MISR 1102 includes a linear feedback shift register (LFSR) 1108 with a predetermined or programmable tap polynomial 1110 and a seed register 1112. The MISR 1102 is configured to sequentially receive multiple bits of pixel data for each pixel in a predetermined or programmable frame region 1118 for each video frame of the video sequence. The MISR 1102 is configured to receive a data valid signal at a clock input to the MISR 1102 in conjunction with each pixel in the predetermined or programmable frame region 1118. The data valid signal causes the MISR 1102 to read the corresponding pixel data along with shifting data stored in the MISR 1102. The MISR 1102 is configured to hold a frame signature value for the predetermined or programmable frame region 1118 of each video frame in conjunction with receiving a frame end signal for the corresponding video frame. The MSSB 1104 is configured to store at least two frame signature values 1114, 1116. The MSSB 1104 is configured to store a current frame signature value 1114 held by the MISR 1102 in conjunction with receiving the frame end signal for the corresponding video frame. The MSSB 1104 is configured to store a reference frame signature value 1116 related to the current frame signature value 1114 for subsequent comparison. The signature comparator 1106 is configured to compare the current and reference frame signature values 1114, 1116 stored by the MSSB 1104 to determine if a fault condition exists for one or more frames in the video sequence.

With continued reference to FIGS. 11 and 15 and further reference to FIGS. 12 and 13, various embodiments of the fault detection circuit 1100 in the display processing circuit 1400 of the integrated circuit 1500 operate in the same manner as described above for the fault detection circuit 1100 of FIG. 11, including the various embodiments of the fault detection circuit 1100 for freeze fault detection (see FIG. 12) and for data mismatch fault detection (see FIG. 13). The input parameters 1548 received by the image processing circuit 1446 may include an image overlay selection signal (see FIG. 16). The image overlay selection signal is associated with selection of an image overlay 1554 to be added to one or more video frames of the video sequence by the image processing circuit 1446. The input parameters 1548 received by the video processor 1442 may include the frame region definition 1118. The input parameters 1448 received by the fault detection circuit 1100 may include the frame region definition 1118, the freeze/mismatch selection signals (see FIGS. 12, 13), the predetermined or programmable freeze fault threshold (see FIG. 12), and the predetermined or programmable signature value (see FIG. 13).

With reference to FIG. 16, a block diagram shows a fault detection circuit 1100 in a display processing circuit 1400 of an integrated circuit 1500. The diagram shows certain input parameters 1448, 1548 and other control signals associated with using the fault detection circuit 1100 to detect faults in a video sequence. The diagram does not include the image processor interface 1440 or the display interface 1444 of the display processing circuit 1400 because these components do not provide the control signals shown in the diagram to the fault detection circuit 1100. The various input parameters 1448, 1548 may be based on user selections at an input device 1602, may be based on predetermined or programmable parameters retrieved from a storage device 1604, or may be based on any suitable combination of user-selected and stored parameters. The input parameters 1548 may include an image overlay selection communicated to the image processing circuit 1446 for selection of an image overlay (see FIG. 15). The input parameters 1448, 1548 may include a frame region definition 1118 communicated to the video processor 1442 to define the frame region of video frames from which pixels are to be extracted and sent to the fault detection circuit 1100. The input parameters 1448 may include freeze/mismatch selection signals, a freeze fault threshold, and a predetermined or programmable signature value frame. The control signals include a video start signal communicated from the image processing circuit 1446 to the fault detection circuit 1100. The control signals include pixel data, a data valid signal, and a frame end signal communicated from the video processor 1442 to the fault detection circuit 1100. The paragraphs above describing FIGS. 11-15 provide additional detail regarding these input parameters and control signals.

The above examples are merely illustrative of several possible embodiments of various aspects of the present disclosure, wherein equivalent alterations and/or modifications will occur to others skilled in the art upon reading and understanding this specification and the associated drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including," "includes," "having," "has," "with," or variants thereof are used in the detailed description and/or in the claims, such terms are intended to be inclusive in a manner similar to the term "comprising." In this disclosure, the phrase "in conjunction with" is intended to broadly include "in response to" as well as any other common or temporal relationship between two or more designated articles. For example, "in conjunction with" may be used in reference to designated articles that have a direct cause-and-effect relationship, an indirect cause-and-effect relationship, a parallel relationship, an overlapping relationship, or any other suitable relationship.

What is claimed is:

1. A fault detection circuit for detecting faults in a video sequence, the fault detection circuit comprising:
a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of the video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame;
a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and
a signature comparator configured to compare the current and reference frame signature values stored by the MSSB to determine if a fault condition exists for one or more frames in the video sequence.

2. The fault detection circuit of claim 1 wherein the MISR is configured to load a non-zero seed value in the seed register for processing each video frame of the video sequence in response to receiving a video start signal for the video sequence and in response to receiving frame end signals for each video frame.

3. The fault detection circuit of claim 1 wherein the predetermined or programmable frame region for each video frame of the video sequence includes all pixels for the corresponding video frame.

4. The fault detection circuit of claim 1 wherein the predetermined or programmable frame region is defined by a reference point identified by horizontal and vertical coordinates in relation to the video frame, a width dimension in relation to the reference pixel, and a height dimension in relation to the reference pixel.

5. The fault detection circuit of claim 1 wherein the MSSB is configured to clear storage locations for frame signature values in response to receiving a video start signal for the video sequence.

6. The fault detection circuit of claim 1 wherein the MSSB is configured to be enabled for freeze fault detection in response to receiving a freeze selection signal.

7. The fault detection circuit of claim 1 wherein, in conjunction with freeze fault detection, the reference frame signature value is a previous frame signature value held by the MISR after receiving a previous frame end signal for a corresponding previous video frame, the previous frame signature value having been held by the MISR after sequentially clocking the multiple bits of pixel data for each pixel in the predetermined or programmable frame region for the corresponding previous video frame through the MISR.

8. The fault detection circuit of claim 7 wherein the MS SB is configured to increment a buffer location pointer in response to receiving the frame end signal to prepare for storage of a next frame signature value held by the MISR after receiving a next frame end signal for a corresponding next video frame.

9. The fault detection circuit of claim 7, the signature comparator comprising:
a freeze comparator configured to compare the current and previous frame signature values, the freeze comparator being configured to increment a freeze counter after determining the current and previous frame signature values are equal and to compare the freeze counter to a predetermined or programmable freeze fault threshold, the freeze comparator being configured to activate a freeze fault interrupt after determining the freeze counter exceeds the predetermined or programmable freeze fault threshold.

10. The fault detection circuit of claim 9 wherein the freeze comparator is configured to reset the freeze counter in response to at least one of 1) receiving a video start signal for the video sequence, 2) determining the current and previous frame signature values are not equal, and 3) activating the freeze fault interrupt.

11. The fault detection circuit of claim 1 wherein the MSSB is configured to be enabled for data mismatch fault detection in response to receiving a mismatch selection signal.

12. The fault detection circuit of claim 1 wherein, in conjunction with data mismatch fault detection, the reference frame signature value is a predetermined or programmable frame signature value associated with an image overlay added to the video frame of the video sequence associated with the current frame signature value, the predetermined or programmable frame region being selected to match the image overlay such that the current frame signature value is expected to match the predetermined or programmable frame signature value.

13. The fault detection circuit of claim 12 wherein the MSSB is configured to store the predetermined or programmable frame signature value in response to receiving a video start signal for the video sequence.

14. The fault detection circuit of claim 12, the signature comparator comprising:
a mismatch comparator configured to compare the current and predetermined or programmable frame signature values, the mismatch comparator being configured to activate a data mismatch fault interrupt after determining the current and predetermined or programmable frame signature values are not equal.

15. The fault detection circuit of claim 14 wherein the mismatch comparator is configured to compare the predetermined or programmable frame signature value with a next frame signature value in response to at least one of 1) determining the current and predetermined or programmable frame signature values are equal and 2) activating the data mismatch fault interrupt.

16. A display processing circuit for detecting faults in a video sequence in conjunction with interfacing the video sequence with a display device, the display processing circuit comprising:
an image processor interface configured to receive pixel data for each video frame of the video sequence from an image processing circuit;
a video processor configured to process the video frames of the video sequence;
a display interface configured to provide the video sequence to a display device; and
a fault detection circuit configured to detect faults in the video sequence, the fault detection circuit comprising:
a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of the video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame;
a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and
a signature comparator configured to compare the current and reference frame signature values stored by the MSSB to determine if a fault condition exists for one or more frames in the video sequence.

17. The display processing circuit of claim 16 wherein the MSSB is configured to be enabled for freeze fault detection in response to receiving a freeze selection signal.

18. The display processing circuit of claim 16 wherein, in conjunction with freeze fault detection, the reference frame signature value is a previous frame signature value held by the MISR after receiving a previous frame end signal for a corresponding previous video frame, the previous frame signature value having been held by the MISR after sequentially clocking the multiple bits of pixel data for each pixel in the predetermined or programmable frame region for the corresponding previous video frame through the MISR.

19. The display processing circuit of claim 18, the signature comparator comprising:
a freeze comparator configured to compare the current and previous frame signature values, the freeze comparator being configured to increment a freeze counter after determining the current and previous frame signature values are equal and to compare the freeze counter to a predetermined or programmable freeze fault threshold, the freeze comparator being configured to activate a freeze fault interrupt after determining the freeze counter exceeds the predetermined or programmable freeze fault threshold.

20. The display processing circuit of claim 16 wherein the MSSB is configured to be enabled for data mismatch fault detection in response to receiving a mismatch selection signal.

21. The display processing circuit of claim 16 wherein, in conjunction with data mismatch fault detection, the reference frame signature value is a predetermined or programmable frame signature value associated with an image overlay added to the video frame of the video sequence associated with the current frame signature value, the predetermined or programmable frame region being selected to match the image overlay such that the current frame signature value is expected to match the predetermined or programmable frame signature value.

22. The display processing circuit of claim 21, the signature comparator comprising:
a mismatch comparator configured to compare the current and predetermined or programmable frame signature values, the mismatch comparator being configured to activate a data mismatch fault interrupt after determining the current and predetermined or programmable frame signature values are not equal.

23. An integrated circuit for detecting faults in a video sequence in conjunction with interfacing an image sensor with a display device, the integrated circuit comprising:
an image capturing circuit configured to form the video sequence of video frames in conjunction with receiving image data originated by an image sensor;
an image processing circuit configured to process the video frames of the video sequence; and
a display processing circuit configured to detect faults in the video sequence in conjunction with interfacing the video sequence with a display device, the display processing circuit comprising:
an image processor interface configured to receive pixel data for each video frame of the video sequence from the image processing circuit;
a video processor configured to process the video frames of the video sequence;
a display interface configured to provide the video sequence to the display device; and a fault detection circuit configured to detect faults in the video sequence, the fault detection circuit comprising:
- a multiple input signature register (MISR) that includes a linear feedback shift register (LFSR) with a tap polynomial and a seed register, the MISR being configured to sequentially receive multiple bits of pixel data for each pixel in a predetermined or programmable frame region for each video frame of the video sequence, the MISR being configured to receive a data valid signal at a clock input to the MISR in conjunction with each pixel in the predetermined or programmable frame region to read the corresponding pixel data and shift the MISR, and the MISR being configured to hold a frame signature value for the predetermined or programmable frame region of each video frame in conjunction with receiving a frame end signal for the corresponding video frame;
- a multiple signature storage buffer (MSSB) configured to store at least two frame signature values, the MSSB being configured to store a current frame signature value held by the MISR in response to receiving the frame end signal for the corresponding video frame, and the MSSB being configured to store a reference frame signature value related the current frame signature value; and
- a signature comparator configured to compare the current and reference frame signature values stored by the MSSB to determine if a fault condition exists for one or more frames in the video sequence.

24. The integrated circuit of claim 23 wherein the MSSB is configured to be enabled for freeze fault detection in response to receiving a freeze selection signal.

25. The integrated circuit of claim 23 wherein, in conjunction with freeze fault detection, the reference frame signature value is a previous frame signature value held by the MISR after receiving a previous frame end signal for a corresponding previous video frame, the previous frame signature value having been held by the MISR after sequentially clocking the multiple bits of pixel data for each pixel in the predetermined or programmable frame region for the corresponding previous video frame through the MISR.

26. The integrated circuit of claim 25, the signature comparator comprising:
- a freeze comparator configured to compare the current and previous frame signature values, the freeze comparator being configured to increment a freeze counter after determining the current and previous frame signature values are equal and to compare the freeze counter to a predetermined or programmable freeze fault threshold, the freeze comparator being configured to activate a freeze fault interrupt after determining the freeze counter exceeds the predetermined or programmable freeze fault threshold.

27. The integrated circuit of claim 23 wherein the MSSB is configured to be enabled for data mismatch fault detection in response to receiving a mismatch selection signal.

28. The integrated circuit of claim 23 wherein, in conjunction with data mismatch fault detection, the reference frame signature value is a predetermined or programmable frame signature value associated with an image overlay added to the video frame of the video sequence associated with the current frame signature value, the predetermined or programmable frame region being selected to match the image overlay such that the current frame signature value is expected to match the predetermined or programmable frame signature value.

29. The integrated circuit of claim 28, the signature comparator comprising:
- a mismatch comparator configured to compare the current and predetermined or programmable frame signature values, the mismatch comparator being configured to activate a data mismatch fault interrupt after determining the current and predetermined or programmable frame signature values are not equal.

* * * * *